United States Patent Office 2,801,231
Patented July 30, 1957

2,801,231

PREPARATION OF LINEAR POLYURETHANES FROM ALKYL DIURETHANES OF AROMATIC DIAMINES

John R. Caldwell, Kingsport, Tenn., assignor to Eastman Kodak Company, Rochester, N. Y., a corporation of New Jersey No Drawing. Application August 10, 1954,
Serial No. 449,013

18 Claims. (Cl. 260—77.5)

This invention relates to the preparation of linear polyurethanes by direct ester-interchange between $\alpha,\omega$-glycols and alkyl diurethanes of aromatic diamines in the presence of certain metallo catalysts which effectively promote condensation between the functional groups without activating the carbon-nitrogen linkages.

Linear polyurethanes, which are useful for making films, fibers and molded objects, have been made by reacting a glycol with a diisocyanate. The condensation polymers are readily prepared in this manner, but the preparation and purification of the diisocyanates is both difficult and costly. Furthermore the diisocyanates are very unstable and are difficult to store and handle because they react rapidly with traces of moisture. In an alternative process, as described in U. S. Patent 2,568,885, linear polyurethanes were prepared from the phenyl esters of diurethanes. The phenyl diurethanes react readily with glycols by ester-interchange to eliminate phenol without the use of a catalyst. The phenyl esters are difficult and costly to prepare, however, and hence it would be advantageous to be able to employ the more economical and more readily prepared alkyl diurethanes.

Heretofore, however, attempts to utilize the alkyl diurethanes in a direct reaction with glycols have been unsuccessful because, unlike the phenyl diurethanes, the alkyl diurethanes will not condense with glycols to form polymers in the absence of catalyst. In the case of the diurethanes, the use of catalysts to promote the polymerization is difficult because in the groups

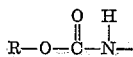

which characterize the diurethanes, there are two linkages which are subject to hydrolysis and alcoholysis, viz: the —O—C— linkage and the —C—N— linkage. Thus, in order to utilize the alkyl diurethanes in direct ester interchange with glycols, a catalyzed process would be necessary and the catalyst employed would have to have a high degree of specificity in its action so that it would activate the carbon-oxygen linkage without, at the same time, activating the carbon-nitrogen linkage which ordinarily is also readily subject to alcoholysis and hydrolysis.

It is accordingly an object of this invention to provide a new and improved process for preparing linear polyurethanes utilizing alkyl diurethanes which are more economically prepared and more readily used than the reactants which had to be employed heretofore.

It is another object of the invention to provide a highly effective process whereby the hitherto unuseable alkyl diurethanes can be utilized in direct ester-interchange condensations with $\alpha,\omega$-glycols without adverse effect on the carbon-nitrogen linkage by providing a specific class of catalysts which, unlike other ester-interchange catalysts, exhibit a high degree of specificity in their activating action as between the two linkages normally subject to hydrolysis and alcoholysis.

Another object of the invention is to facilitate the manufacture of linear polyurethanes which can be used for forming fibers, films, molded objects and the like.

Another object of the invention is to provide a method for catalyzing direct ester-interchange between $\alpha,\omega$-glycols and alkyl diurethanes of aromatic diamines to form highly polymeric materials.

Other objects will be apparent from the description and claims which follow.

These and other objects are attained by means of this invention which comprises making a linear polyurethane by direct ester-interchange between an $\alpha,\omega$-glycol and an alkyl diurethane of an aromatic diamine by heating a mixture of a bifunctional alkyl diurethane of an aromatic diamine, characterized by the structure

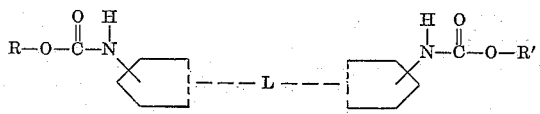

wherein R and R' are alkyl groups of 1–6 carbon atoms and

represents an aromatic nucleus free of functional linkages (i. e. free of functional groups such as hydroxylic or carboxylic groups capable of entering into the condensation reaction by splitting at a functional linkage), an aliphatic $\alpha,\omega$-glycol, and a metallo catalyst which is a trivalent or tetravalent metal compound in which all valences of the metal are satisfied by one or more of the radicals consisting of oxide, alkyl, alkoxide, phenyl and acyl radicals.

The preparation of linear condensation polymers proceeds in the manner described in U. S. Patent 2,071,250 by reaction between bifunctional components such as glycols and dibasic acids, either in free or esterified form. In the case of the alkyldiurethanes of this invention, two functional radicals

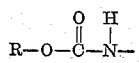

and

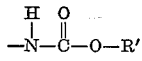

are joined to an aromatic nucleus in either the meta or para positions. The nature of the aromatic nucleus can vary widely provided the aromatic nucleus contains no functional group, i. e. the alkyl diurethanes of the invention are bifunctional reactants which function as do any dibasic carboxylic acids in any condensation polymerization. This invention is concerned with the process of forming condensation polymers with alkyl esters of diurethanes of any aromatic diamines, the products obtained from the process being the same as the linear polyurethanes from other processes. The invention is predicated upon the discovery that such alkyl esters of diurethanes of aromatic diamines, which ordinarily will not condense directly with glycols, will condense in the desired manner when the metallo catalysts defined herein are used to promote the reaction. Unexpectedly, these catalysts activate the linkage

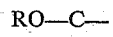

whereby alcohol is split off in the condensation without at the same time activating the carbon-nitrogen linkage between the carboxylic carbon and the amido nitrogen. The reason for the specificity of this particular class of catalysts is not known, and the invention will not be limited by any theory which might be advanced in explanation of this result.

The metallo catalysts employed in practicing the invention are compounds of either trivalent or tetravalent metals such as tin, titanium, lead, zirconium, aluminum and the like. In the catalysts, all valences of the metal are satisfied with oxide radicals, alkyl radicals of 1–4 carbon atoms, alkoxide radicals of 1–4 carbon atoms, phenyl radicals or acyl radicals of 2–18 carbon atoms. The catalyst compound can have all valences satisfied by a single type of radical or it can have two or more of such types of radicals attached to a metal atom. Thus, the catalysts which are suitable include the unmixed oxides, alkoxides, acylates, phenyl or alkyl derivatives of the trivalent and tetravalent metals, as well as the mixed compounds such as alkyl oxide, alkyl phenyl, alkyl acyl and similar derivatives of the metals. Thus, for example, typical metallo catalysts which are suitable for use in practicing the invention include titanium tetrabutoxide, dibutyltin diacetate, dibutyl diphenyltin, lead oxide, zirconium tetrabutoxide, titanium tetra-ethoxide, dibutyltin oxide aluminum butoxide, tetrabutyl tin, diethyl tin dibutyrate, dimethyl tin dibenzoate, diethyl tin diethoxide, dibutyl tin dibutoxide, titanium tetrapropoxide, zirconium tetraethoxide, tetraethyl lead, tetramethyl lead and the like.

The alkyl diurethanes employed in practicing the invention can be prepared in any desired manner. They are conveniently made by treating an aromatic diamine with slightly more than two molar equivalents of an alkyl chlorocarbonate in the presence of alkali, according to the following equation:

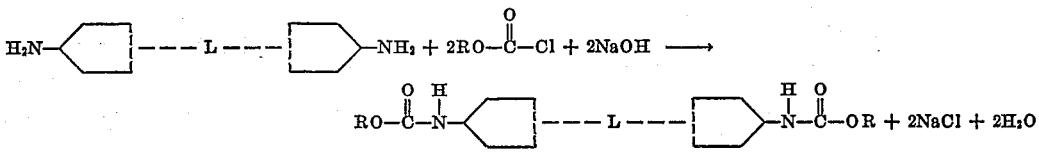

The alkyl diurethanes thus prepared are crystalline solids.

Since the alkyl urethane groups are the functional groups, any aromatic diamine can be used. The aromatic nucleus can be a single carbocyclic ring such as

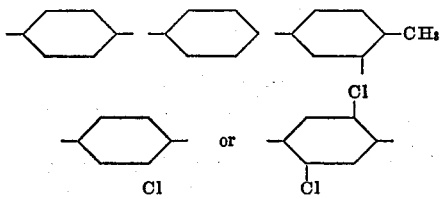

or it can be a fused ring structure such as

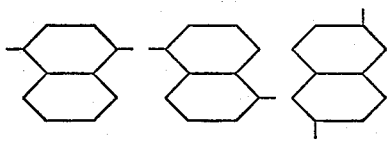

or

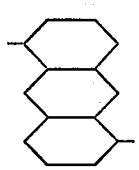

The preferred alkyl diurethanes are those derived from diamines wherein the aromatic nucleus has two unfused carbocyclic rings such as

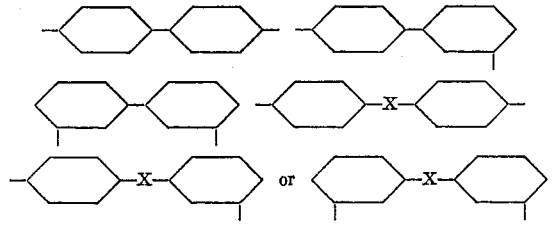

in which X is a non-functional linking group such as $$-O-, \quad -S-, \quad -SO_2-, \quad -NR-, \quad -O-(CH_2)_{n-1-4}-O-$$
$$-(CH_2)_{n-1-4}-, \quad -(CH_2)_{n-1 \text{ or } 2}-O-(CH_2)_{n-1 \text{ or } 2}-$$
$$\underset{R}{\overset{R}{-\underset{|}{C}-}}(CH_2)_{n-1 \text{ or } 3}-, \quad -C(CH_3)_2-, \quad -SO_2NH-, \quad -CONH-$$

and the like.

Thus a very useful group of alkyl diurethanes are derived from phenylene diamines and have the formula

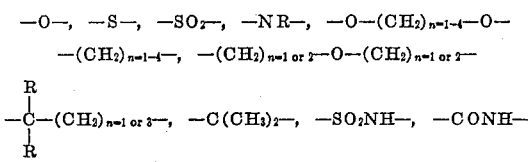

wherein R and R' are alkyl groups of 1–6 carbon atoms such as methyl, ethyl, butyl and hexyl groups, and the urethane groups are either meta or para.

Another highly useful group of alkyl diurethanes are those derived from an alkylene dianiline and have the formula

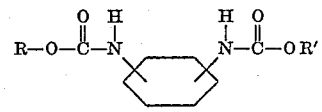

in which R and R' are alkyl groups of 1–6 carbon atoms and $n=1-4$.

The diaminoaryl sulfones also form alkyl diurethanes which are of particular utility in the manufacture of linear polyurethanes in accordance with the invention and such compounds have the formula

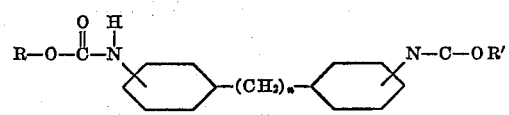

in which R and R' are alkyl groups of 1–6 carbon atoms. As in the other alkyl diurethanes of the invention, the carbocyclic rings can also be substituted with lower alkyl groups without affecting the process of the invention.

The alkyl diurethanes suitable for use in accordance with the invention also include those of the formula

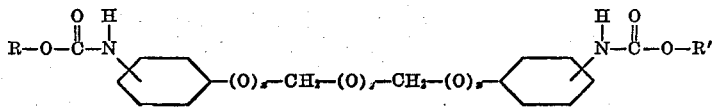

in which R and R' are alkyl groups of 1–6 carbon atoms and x and y are either 0 or 1, one of x or y always being 0 and the other 1. Thus, these compounds include compounds of the formula

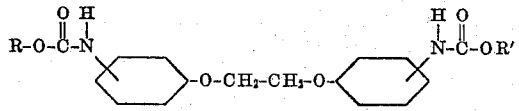

as well as compounds of the formula

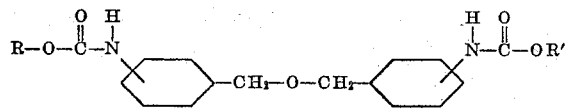

Other suitable materials include compounds of the formula

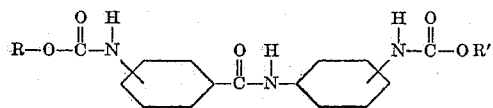

as well as the alkyl diurethanes of diamines containing two or three fused carbocyclic rings such as diaminonaphthalene.

It is thus apparent that the aromatic nucleus can have a widely varying character and that the alkyl diurethanes used in practicing the invention can be derived from any aromatic diamines in which the aromatic nucleus is free of functional groups or linkages which are capable of entering into condensation reactions, and the process aspects of the invention are thus not limited to any particular alkyl diurethanes except as specifically indicated herein.

In the process embodying the invention, the alkyl diurethane is condensed with an aliphatic α,ω-glycol. As in the case of the alkyl diurethane, the nature of the α,ω-glycol is not critical and any of the bifunctional aliphatic glycols can be used which contain from 2 to 10 carbon atoms in a straight or branched chain configuration. In many cases, the α,ω-polymethylene glycols are used for convenience, such as ethylene glycol, trimethylene glycol, tetramethylene glycol, pentamethylene glycol, hexamethylene glycol, octamethylene glycol and decamethylene glycol. The branched-chain glycols such as 2,2-dimethyl-1,3-propanediol, and 2,2-dimethyl-1,4-butanediol are quite suitable, however, and it is not intended that the invention shall be limited to any particular aliphatic α,ω-glycols since all such glycols are suitably employed.

The preparation of the linear polyurethanes using the novel combination of reactants and catalyst can be carried out in accordance with the usual techniques employed for forming linear polyesters from glycols and dibasic acid esters. In general, the linear polyurethanes are prepared by heating the alkyl diurethane with 25–100 mole percent excess of the glycol in the presence of the catalyst. The catalyst is desirably used in amounts of from 0.005% to 0.1% by weight and preferably from 0.01% to 0.06% by weight based on the weight of the reactants. The preferred catalysts are lead oxide (Pb₃O₄), titanium tetra-alkoxides, zirconium tetra-alkoxides, aluminum tri-alkoxides, tin tetra-alkoxides, mixed alkyl-acyl derivatives of tin, mixed aryl-acyl derivatives of tin, and mixed alkyl-aryl derivatives of tin. The alkoxide group can contain 1–8 carbon atoms but preferably contains 1–4 carbon atoms, such as methoxide, ethoxide, isopropoxide and butoxide groups. The alkyl groups likewise can contain 1–8 carbon atoms but desirably contain 1–4 carbon atoms. The acyl groups can vary from 2–18 carbon atoms and include acetates, butyrates, laurates, oleates, palmitates and stearates. Mixed alkyl-acyl and aryl-acyl derivatives of tin are typified by dibutyltin diacetate and diphenyl tin dilaurate.

In accordance with polyester practice, the first stage of the reaction is desirably effected at 180–220° C. and atmospheric pressure in order to distill out the alcohol formed by ester-interchange and produce low molecular weight urethanes of the glycol. The temperature is then raised to 220–250° C., depending upon the melting point of the polyurethane. Some of the excess glycol is distilled out at this stage. The final phase of the reaction is then carried out under vacuum with good agitation in order to facilitate the escape of volatile products from the highly viscous melt.

Alternatively, the polymer can be made by the solid-phase process wherein a prepolymer having an inherent viscosity of 0.15 to 0.30 is prepared by stirring the melted polymer under vacuum as described hereinabove, the prepolymer solidified and pulverized to a particle size of about 0.01–0.03 inch, and the pulverized polymer heated in vacuum or in a stream of inert gas at 200–250° C. until the desired viscosity is obtained. Ordinarily it is desirable to carry out the process of the invention until the linear polyurethane thus formed has an inherent viscosity of at least 0.4 and preferably about 0.6 or higher. Regardless of the method employed, moisture and oxygen are excluded at all stages of the reaction. The polymers can be prepared by either batch or continuous processes as desired.

The linear polyurethanes prepared in accordance with the invention can be dissolved in organic solvents such as dimethyl formamide, dimethyl acetamide, formic acid and dichloroacetic acid. They can be either wet or dry spun to form synthetic fibers of excellent chemical and mechanical characteristics. Clear, tough films can be readily prepared by extruding the polymers or by casting films from solution onto a suitable surface. The films thus prepared can be used for a variety of applications including use as film base in photographic applications including either black-and-white or color film. The linear polymers are also useful for preparing a variety of molded objects by either injection or compression molding techniques. The high melting point of the polyurethanes makes them useful for a variety of applications where lower melting materials are unsuitable. The polymers which are particularly useful are those having a molecular weight of 10,000 to 30,000 or higher. An advantage of the polymers of the invention is their ready dyeability in fiber form.

The invention is illustrated by the following examples of certain preferred embodiments thereof:

*Example 1*

The alkyl diurethane, 4,4'-methylene dicarbanilic acid diethyl ester, of the formula

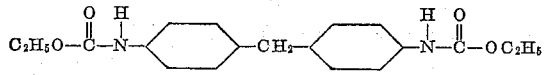

was prepared by treating 4,4'-methylenedianiline with excess ethyl chlorocarbonate in the presence of sodium hydroxide. The diurethane thus obtained had a melting point of 134.5° C. A mixture of 342 g. (1.0 mole) of the 4,4'-methylene dicarbanilic acid diethyl ester, 135 g. (1.5 moles) of butanediol-1,4 and a solution of 0.05 g. of titanium tetrabutoxide in 5 cc. of butyl alcohol was stirred at 190–200° C. in an atmosphere of purified hydrogen. Ethyl alcohol was distilled out of the reaction mixture as the ester-interchange proceeded. When the distillation of ethyl alcohol had practically stopped, the temperature was raised to 240–250° C. and held for 10 minutes. A vacuum of 0.1 mm. was then applied and the heating and stirring continued for an additional 25 minutes until a polyurethane melt having an inherent viscosity of 0.60 as measured in a solution of 60% phenol–40% tetrachloroethane was obtained. The polyurethane thus produced was soluble in dimethylformamide, dimethylacetamide, dichloroacetic acid and formic acid, and had a melting point of 235–240° C. Strong elastic fibers were obtained by extruding the molten polyurethane through a spinnerette. The product was extruded through a die to give clear, tough films.

*Example 2*

A solution of 0.08 g. of dibutyltin diacetate in 5 cc. of ethyl alcohol was added as catalyst to a mixture of 342 g. (1.0 mole) of 4,4'-methylene dicarbanilic acid diethyl ester and 152 g. (2.0 moles) of trimethylene glycol. The mixture was stirred at 190° C. in an atmosphere of pure nitrogen until the distillation of ethyl alcohol had practically ceased. The temperature was then raised to 220° C. and held for 10 minutes, after which time a vacuum of 0.1 mm. was applied. Stirring was continued until the polymer had an inherent viscosity of about 0.2. The polymer was removed from the vessel and ground to a particle size of 0.01 to 0.03 inch. The powdered polymer was then heated in vacuum at 210° C. for 4 hours. The polyurethane thereby obtained had an inherent viscosity of 0.65 in 60% phenol-40% tetrachloroethane solution, and had solubility properties similar to the polymer described in the preceding example. The polymer had a melting point of 240–250° C. and was useful for the production of films, fibers and molded objects by the usual processing methods.

*Example 3*

4,4-methylene dicarbanilic diethyl ester and 2,2-dimethyl propanediol were condensed using dibutyl diphenyltin as catalyst in accordance with the procedure of Example 1. The polyurethane thereby obtained was similar to that obtained in Example 1.

*Example 4*

Lead oxide (Pb₃O₄) was used to catalyze the polymerization of excess tetramethylene glycol with a diurethane of the formula

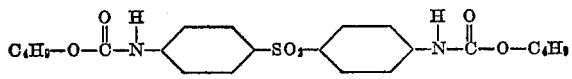

as described in the preceding examples. The linear polyurethane thereby obtained melted at 220–230° C. and was useful as a molding plastic and for making photographic film base.

*Example 5*

Lead oxide (Pb₃O₄) gave equally good results when hexamethylene glycol was condensed with the diurethane set out in the preceding example. The polyurethane obtained melted at 185–195° C.

*Example 6*

The diamine of the formula

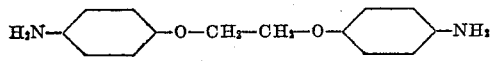

was converted to the corresponding ethyl diurethane by treating it with ethyl chlorocarbonate in the presence of alkali. The condensation of the resulting diurethane with tetramethylene glycol was catalyzed by means of zirconium tetra-butoxide to give a polyurethane which was suitable for the manufacture of fibers and films.

*Example 7*

The diurethane of the formula

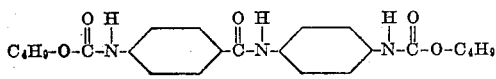

prepared by reacting the corresponding diamine with butylchlorocarbonate in the presence of alkali, was condensed with trimethylene glycol in the presence of titanium tetra-ethoxide in accordance with the procedure of Example 1. The polyurethane thus obtained melted at 240–250° C.

*Example 8* p-Phenylenediamine was converted to the diurethane with ethylchlorocarbonate. The diurethane was heated with 2,2-dimethyl butanediol in the presence of dibutyltin oxide to give a polyurethane which was useful for the manufacture of photographic film base.

*Example 9*

1,4-diaminonaphthalene was converted to the diurethane by means of ethyl chlorocarbonate. The diurethane was heated with ethylene glycol, using aluminum butoxide to give a polyurethane.

Thus, by means of this invention, the alkyl diurethanes of aromatic diamines can be employed in the preparation of linear polyurethanes by direct ester-interchange with aliphatic α,ω-glycols using catalysts having a specific activating action. By means of this invention, linear polyurethanes can be prepared more economically than using phenyl diurethanes and more easily than by using diisocyanates. The products are produced readily and of excellent quality suitable for use in a variety of applications.

Although the invention has been described in detail with reference to certain preferred embodiments, variations and modifications can be effected within the spirit and scope of the invention as described hereinabove and as defined in the appended claims.

I claim:

1. The method of making a linear polyurethane by direct ester-interchange between an α,ω-glycol and an alkyl diurethane of an aromatic diamine which comprises heating a mixture of a bifunctional alkyl diurethane of an aromatic diamine characterized by the structure

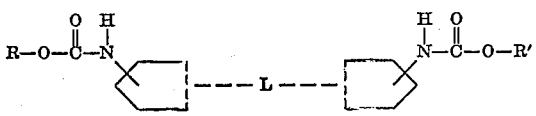

wherein R and R' are alkyl groups of 1–6 carbon atoms, and

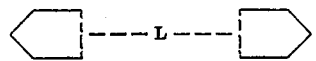

represents an aromatic nucleus free of functional linkages, an aliphatic α,ω-glycol, and a metallo catalyst of the group consisting of trivalent and tetravalent metals having all valences satisfied by members of the group consisting of oxide, C₁—C₄ alkyl, C₁—C₄ alkoxide, phenyl and C₂—C₁₈ acyl radicals consisting solely of carbon, hydrogen and oxygen, said catalyst being effective to activate the —O—C— linkages without activating the —C—N— linkages of said diurethane.

2. The method of making a linear polyurethane by direct ester-interchange between an α,ω-glycol and an alkyl diurethane of an aromatic diamine which comprises heating a mixture of a bifunctional alkyl diurethane of an aromatic diamine characterized by the structure

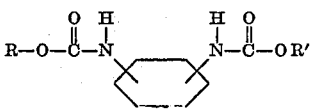

wherein R and R' are alkyl groups of 1–6 carbon atoms, an aliphatic α,ω-glycol, and a metallo catalyst of the group consisting of trivalent and tetravalent metals having all valences satisfied by members of the group consisting of oxide, C₁—C₄ alkyl, C₁—C₄ alkoxide, phenyl and C₂—C₁₈ acyl radicals consisting solely of carbon, hydrogen and oxygen, said catalyst being effective to activate the —O—C— linkages without activating the —C—N— linkages of said diurethane.

3. The method of making a linear polyurethane by direct ester-interchange between an α,ω-glycol and an alkyl diurethane of an aromatic diamine which comprises heating a mixture of a bifunctional alkyl diurethane of an aromatic diamine characterized by the structure

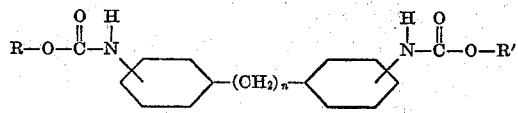

wherein R and R' are alkyl groups of 1-6 carbon atoms, and $n$ is 0-4, an aliphatic $\alpha,\omega$-glycol, and a metallo catalyst of the group consisting of trivalent and tetravalent metals having all valences satisfied by members of the group consisting of oxide, $C_1$—$C_4$ alkyl, $C_1$—$C_4$ alkoxide, phenyl and $C_2$—$C_{18}$ acyl radicals consisting solely of carbon, hydrogen and oxygen, said catalyst being effective to activate the —O—C— linkages without activating the —C—N— linkages of said diurethane.

4. The method of making a linear polyurethane by direct ester-interchange between an $\alpha,\omega$-glycol and an alkyl diurethane of an aromatic diamine which comprises heating a mixture of a bifunctional alkyl diurethane of an aromatic diamine characterized by the structure

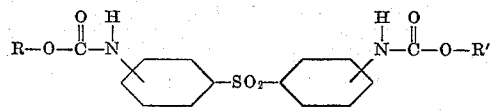

wherein R and R' are alkyl groups of 1-6 carbon atoms, an aliphatic $\alpha,\omega$-glycol, and a metallo catalyst of the group consisting of trivalent and tetravalent metals having all valences satisfied by members of the group consisting of oxide, $C_1$—$C_4$ alkyl, $C_1$—$C_4$ alkoxide, phenyl and $C_2$—$C_{18}$ acyl radicals consisting solely of carbon, hydrogen and oxygen, said catalyst being effective to activate the —O—C— linkages without activating the —C—N— linkages of said diurethane.

5. The method of making a linear polyurethane by direct ester-interchange between an $\alpha,\omega$-glycol and an alkyl diurethane of an aromatic diamine which comprises heating a mixture of a bifunctional alkyl diurethane of an aromatic diamine characterized by the structure

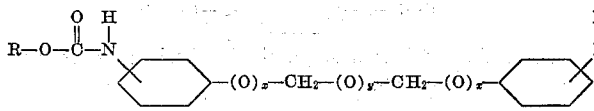

wherein R and R' are alkyl groups of 1-6 carbon atoms, and $x$ and $y$ are from the group consisting of 0 and 1, one of $x$ and $y$ being 0 and the other of $x$ and $y$ being 1, an aliphatic $\alpha,\omega$-glycol, and a metallo catalyst of the group consisting of trivalent and tetravalent metals having all valences satisfied by members of the group consisting of oxide, $C_1$—$C_4$ alkyl, $C_1$—$C_4$ alkoxide, phenyl and $C_2$—$C_{18}$ acyl radicals consisting solely of carbon, hydrogen and oxygen, said catalyst being effective to activate the —O—C— linkages without activating the —C—N— linkages of said diurethane.

6. The method of making a linear polyurethane by direct ester-interchange between an $\alpha,\omega$-glycol and an alkyl diurethane of an aromatic diamine which comprises heating a mixture of a bifunctional alkyl diurethane of an aromatic diamine characterized by the structure

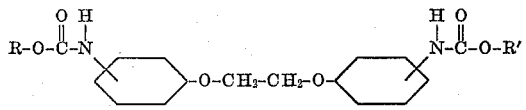

wherein R and R' are alkyl groups of 1-6 carbon atoms, an aliphatic $\alpha,\omega$-glycol, and a metallo catalyst of the group consisting of trivalent and tetravalent metals having all valences satisfied by members of the group consisting of oxide, $C_1$—$C_4$ alkyl, $C_1$—$C_4$ alkoxide, phenyl and $C_2$—$C_{18}$ acyl radicals consisting solely of carbon, hydrogen and oxygen, said catalyst being effective to activate the —O—C— linkages without activating the —C—N— linkages of said diurethane.

7. The method of making a linear polyurethane by direct ester-interchange between an $\alpha,\omega$-gylcol and an alkyl diurethane of an aromatic diamine which comprises heating a mixture of a bifunctional alkyl diurethane of an aromatic diamine characterized by having the groups

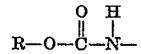

and

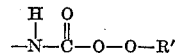

joined to a fused ring aromatic nucleus containing 2-3 carbocyclic rings, R and R' being alkyl groups of 1-6 carbon atoms, an aliphatic $\alpha,\omega$-glycol, and a metallo catalyst of the group consisting of trivalent and tetravalent metals having all valences satisfied by members of the group consisting of oxide, $C_1$—$C_4$ alkyl, $C_1$—$C_4$ alkoxide, phenyl and $C_2$—$C_{18}$ acyl radicals consisting solely of carbon, hydrogen and oxygen, said catalyst being effective to activate the —O—C— linkages without activating the —C—N— linkages of said diurethane.

8. The method of making a linear polyurethane by direct ester-interchange between an $\alpha,\omega$-glycol and an alkyl diurethane of an aromatic diamine which comprises heating a mixture of a bifunctional alkyl diurethane of an aromatic diamine wherein each alkyl group contains 1-6 carbon atoms and the aromatic diamine is 1,4-diamino-naphthalene, an aliphatic $\alpha,\omega$-glycol, and a metallo catalyst of the group consisting of trivalent and tetravalent metals having all valences satisfied by members of the group consisting of oxide, $C_1$—$C_4$ alkyl, $C_1$—$C_4$ alkoxide, phenyl and $C_2$—$C_{18}$ acyl radicals consisting solely of carbon, hydrogen and oxygen, said catalyst being effective to activate the —O—C— linkages without activating the —C—N— linkages of said diurethane.

9. The method of making a linear polyurethane by 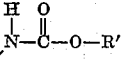 direct ester-interchange between an $\alpha,\omega$-glycol and an alkyl diurethane of an aromatic diamine having the structure

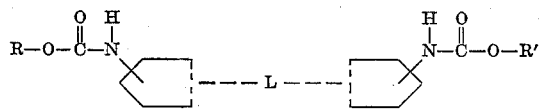

wherein R and R' are alkyl groups of 1-6 carbon atoms and

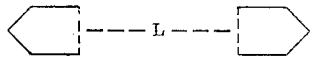

represents an aromatic nucleus free of functional linkages, which method comprises heating a mixture of an $\alpha,\omega$-polymethylene glycol containing 2-6 carbon atoms, said alkyl diurethane, and a metallo catalyst from the group consisting of trivalent and tetravalent metals having all valences satisfied by members of the group consisting of oxide, $C_1$—$C_4$ alkyl, $C_1$—$C_4$ alkoxide, phenyl and $C_2$—$C_{18}$ acyl radicals consisting solely of carbon, hydrogen and oxygen, said catalyst being effective to activate the —O—C— linkages without activating the —C—N— linkages of said diurethane.

10. The method of making a linear polyurethane by direct ester-interchange between an $\alpha,\omega$-glycol and an alkyl diurethane of an aromatic diamine having the structure

wherein R and R' are alkyl groups of 1–6 carbon atoms and

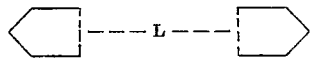

represents an aromatic nucleus free of functional linkages, which method comprises heating a mixture of an α,ω-polymethylene glycol containing 2–6 carbon atoms, said alkyl diurethane, and a metallo catalyst comprising an alkoxide of a tetravalent metal.

11. The method of making a linear polyurethane by direct ester-interchange between an α,ω-glycol and an alkyl diurethane of an aromatic diamine having the structure

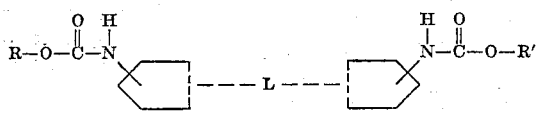

wherein R and R' are alkyl groups of 1–6 carbon atoms and

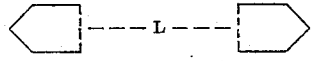

represents an aromatic nucleus free of functional linkages, which method comprises heating a mixture of an α,ω-polymethylene glycol containing 2–6 carbon atoms, said alkyl diurethane, and $Pb_3O_4$ as a catalyst.

12. The method of making a linear polyurethane by direct ester-interchange between an α,ω-glycol and an alkyl diurethane of an aromatic diamine having the structure

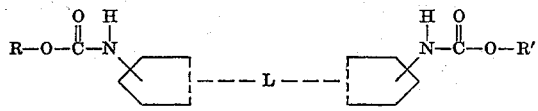

wherein R and R' are alkyl groups of 1–6 carbon atoms and

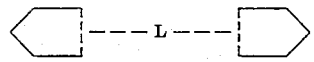

represents an aromatic nucleus free of functional linkages, which method comprises heating a mixture of an α,ω-polymethylene glycol containing 2–6 carbon atoms, said alkyl diurethane, and an aluminum alkoxide catalyst.

13. The method of making a linear polyurethane which comprises heating a mixture of an aliphatic α,ω-glycol, an alkyl diester of 4,4'-methylene-dicarbanilic acid wherein each alkyl group contains 1–6 carbon atoms, and a metallo catalyst from the group consisting of trivalent and tetravalent metals having all valences satisfied with members of the group consisting of oxide, $C_1$—$C_4$ alkyl, $C_1$—$C_4$ alkoxide, phenyl and $C_2$—$C_{18}$ acyl radicals consisting solely of carbon, hydrogen and oxygen.

14. The method of making a linear polyurethane which comprises heating a mixture of an aliphatic α,ω-glycol, an alkyl diester of 4,4'-methylenedicarbanilic acid wherein each alkyl group contains 1–6 carbon atoms, and a titanium butoxide catalyst.

15. The method of making a linear polyurethane which comprises heating a mixture of an aliphatic α,ω-glycol, an alkyl diester of 4,4'-methylenedicarbanilic acid wherein each alkyl group contains 1–6 carbon atoms, and dibutyltin diacetate catalyst.

16. The method of making a linear polyurethane which comprises heating a mixture of an aliphatic α,ω-glycol, an alkyl diester of 4,4'-methylenedicarbanilic acid wherein each alkyl group contains 1–6 carbon atoms, and dibutyl diphenyltin catalyst.

17. The method of making a linear polyurethane which comprises heating a mixture of α,ω-polymethylene glycol containing 2–6 carbon atoms, an alkyl diester of the compound

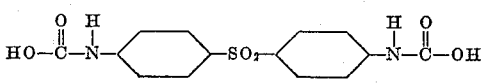

wherein each alkyl group contains 1–6 carbon atoms, and $Pb_3O_4$ catalyst.

18. The method of making a linear polyurethane which comprises heating a mixture of 2,2-dimethylbutanediol an alkyl diester of the compound

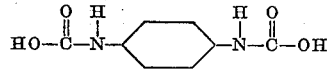

wherein the alkyl groups contain 1–6 carbon atoms, and dibutyltinoxide catalyst.

References Cited in the file of this patent

Ser. No. 352,550, Schlack (A. P. C.), published Apr. 20, 1943.